(12) United States Patent
    Zhang

(10) Patent No.: US 10,838,739 B2
(45) Date of Patent: Nov. 17, 2020

(54) NETWORK-CONNECTED COMPUTING DEVICES AND METHODS FOR EXECUTING OPERATING PROGRAMS IN RAM MEMORY

(71) Applicant: Circle Media Labs Inc., Portland, OR (US)

(72) Inventor: Tiebing Zhang, Cypress, CA (US)

(73) Assignee: Circle Media Labs Inc., Portland, OR (US)

( * ) Notice: Subject to any disclaimer, the term of this patent is extended or adjusted under 35 U.S.C. 154(b) by 279 days.

(21) Appl. No.: 15/957,265

(22) Filed: Apr. 19, 2018

(65) Prior Publication Data

US 2019/0324764 A1    Oct. 24, 2019

(51) Int. Cl.
    *G06F 9/44*      (2018.01)
    *H04L 29/06*     (2006.01)
    *G06F 9/4401*    (2018.01)
    *H04L 12/773*    (2013.01)

(52) U.S. Cl.
    CPC ........... *G06F 9/4416* (2013.01); *H04L 63/10* (2013.01); *H04L 45/60* (2013.01)

(58) Field of Classification Search
    CPC ........... G06F 9/44; G04L 63/10; H04L 29/06
    See application file for complete search history.

(56) References Cited

U.S. PATENT DOCUMENTS 5,884,316 A    3/1999  Bernstein et al.
5,963,540 A   10/1999  Bhaskaran
6,219,786 B1   4/2001  Cunningham et al.
6,912,223 B1   6/2005  Sloane
(Continued)

FOREIGN PATENT DOCUMENTS

DE    102014216588 A1    2/2016

OTHER PUBLICATIONS

Srisureh, P. et al., "IP Network Address Translator (NAT) Terminology and Considerations," The Internet Society (Aug. 1999), pp. 1-30.

(Continued)

*Primary Examiner* — Phil K Nguyen
(74) *Attorney, Agent, or Firm* — Dascenzo Gates Intellectual Property Law, P.C.

(57) ABSTRACT

A network-connected device, and methods for executing operating programs stored in a RAM-based file storage system, where the network-connected device includes a bootloader configured to be executed during a boot of the network-connected device. When executed, the bootloader causes the network-connected device to connect to an external computing device via a network, and to download an operating program. The network-connected device then stores the operating program in a RAM-based file storage system that is located in a simulated disk drive that resides in the RAM memory, and executes the operating program from within the RAM-based file storage system. In some embodiments, the network-connected device also is configured to store configuration files in the RAM-based file storage system, make changes to the configuration files stored in the RAM-based file storage system, and synchronize those changes with a remote persistent file store hosted by an external computing device.

15 Claims, 6 Drawing Sheets

(56) References Cited

U.S. PATENT DOCUMENTS

| | | |
|---|---|---|
| 6,981,245 B1 | 12/2005 | Schwabe |
| 7,046,139 B2 | 5/2006 | Kuhn et al. |
| 7,313,384 B1* | 12/2007 | Meenan .................. H04L 63/08 |
| | | 455/410 |
| 7,567,573 B2 | 7/2009 | Foss |
| 7,583,457 B2 | 9/2009 | Miller et al. |
| 7,828,218 B1 | 11/2010 | De Jong |
| 7,849,502 B1 | 12/2010 | Bloch et al. |
| 7,881,697 B2 | 2/2011 | Baker et al. |
| 7,899,438 B2 | 3/2011 | Baker et al. |
| 7,904,518 B2 | 3/2011 | Marino et al. |
| 7,945,238 B2 | 5/2011 | Baker et al. |
| 8,078,140 B2 | 12/2011 | Baker et al. |
| 8,285,249 B2 | 10/2012 | Baker et al. |
| 8,301,753 B1 | 10/2012 | Melvin |
| 8,432,260 B2 | 4/2013 | Talty et al. |
| 8,588,735 B1 | 11/2013 | Baker et al. |
| 8,594,619 B1 | 11/2013 | Baker et al. |
| 8,600,348 B1 | 12/2013 | Baker et al. |
| 8,611,885 B1 | 12/2013 | Baker et al. |
| 8,630,612 B1 | 1/2014 | Baker et al. |
| 8,634,801 B1 | 1/2014 | Baker et al. |
| 8,634,802 B1 | 1/2014 | Baker et al. |
| 8,634,803 B1 | 1/2014 | Baker et al. |
| 8,639,216 B1 | 1/2014 | Baker et al. |
| 8,644,796 B1 | 2/2014 | Baker et al. |
| 8,667,559 B1 | 3/2014 | Baker et al. |
| 8,667,579 B2 | 3/2014 | Leeder |
| 8,706,079 B1 | 4/2014 | Baker et al. |
| 8,712,371 B2 | 4/2014 | Baker et al. |
| 8,725,109 B1 | 5/2014 | Baker et al. |
| 8,731,517 B1 | 5/2014 | Baker et al. |
| 8,755,768 B1 | 6/2014 | Baker et al. |
| 8,762,547 B2 | 6/2014 | Stanev |
| 8,774,754 B1 | 7/2014 | Baker et al. |
| 8,774,755 B1 | 7/2014 | Baker et al. |
| 8,813,188 B2 | 8/2014 | Vauclair et al. |
| 8,819,784 B2 | 8/2014 | Monjas Llorente et al. |
| 8,918,080 B2 | 12/2014 | Neal et al. |
| 8,929,857 B2 | 1/2015 | Baker et al. |
| 8,935,757 B2 | 1/2015 | Srinivasan et al. |
| 8,995,952 B1 | 3/2015 | Baker et al. |
| 9,125,057 B2 | 9/2015 | Neal et al. |
| 9,137,386 B1 | 9/2015 | Baker et al. |
| 9,137,389 B2 | 9/2015 | Baker et al. |
| 9,237,433 B1 | 1/2016 | Baker et al. |
| 9,256,722 B2 | 2/2016 | Saxman et al. |
| 9,344,185 B2 | 5/2016 | Lo |
| 9,432,240 B2 | 8/2016 | Galchev |
| 9,450,963 B2 | 9/2016 | Srinivasan et al. |
| 9,634,896 B2 | 8/2017 | Zhang et al. |
| 9,769,038 B1 | 9/2017 | Baldi et al. |
| 9,900,236 B2 | 2/2018 | Zhang et al. |
| 10,078,762 B1* | 9/2018 | Gu .......................... H04L 63/20 |
| 2003/0026404 A1 | 2/2003 | Joyce et al. |
| 2003/0074466 A1 | 4/2003 | Hughes et al. |
| 2003/0140283 A1 | 7/2003 | Nishio |
| 2003/0237018 A1 | 12/2003 | Baba |
| 2005/0144297 A1 | 6/2005 | Dahlstrom et al. |
| 2006/0026304 A1 | 2/2006 | Price |
| 2006/0041737 A1* | 2/2006 | Kumagai ............... H04W 24/04 |
| | | 713/1 |
| 2006/0050703 A1 | 3/2006 | Foss |
| 2006/0150240 A1 | 7/2006 | Robinson et al. |
| 2007/0027965 A1* | 2/2007 | Brenes .................... H04L 51/00 |
| | | 709/220 |
| 2007/0260868 A1 | 11/2007 | Azzarello et al. |
| 2008/0046879 A1 | 2/2008 | Hostetler et al. |
| 2008/0081580 A1 | 4/2008 | Cole |
| 2008/0127295 A1 | 5/2008 | Pirzada et al. |
| 2008/0235514 A1* | 9/2008 | Walker ................ H04L 41/0806 |
| | | 713/185 |
| 2009/0031008 A1* | 1/2009 | Elliott .................. H04L 61/1517 |
| | | 709/220 |
| 2009/0319649 A1* | 12/2009 | Larsen ................ H04L 41/0846 |
| | | 709/222 |
| 2009/0328205 A1 | 12/2009 | Ims et al. |
| 2010/0332212 A1 | 12/2010 | Finkelman |
| 2012/0023593 A1 | 1/2012 | Puder et al. |
| 2013/0103660 A1* | 4/2013 | Welsh .................. H04L 12/2812 |
| | | 707/705 |
| 2014/0052976 A1* | 2/2014 | Marino .................... H04L 51/12 |
| | | 713/2 |
| 2014/0064149 A1* | 3/2014 | Frey .................... H04L 41/0869 |
| | | 370/255 |
| 2014/0164616 A1 | 6/2014 | Pinto et al. |
| 2014/0370846 A1 | 12/2014 | Neal |
| 2014/0370847 A1 | 12/2014 | Neal |
| 2014/0372286 A1 | 12/2014 | Neal |
| 2015/0180850 A1 | 6/2015 | Venkataramana et al. |
| 2015/0222759 A1 | 8/2015 | Baker et al. |
| 2015/0271665 A1 | 9/2015 | Baker et al. |
| 2016/0315930 A1 | 10/2016 | Kim et al. |
| 2017/0093910 A1* | 3/2017 | Gukal .................. H04L 63/1416 |
| 2017/0164190 A1* | 6/2017 | Weksler ................ H04W 12/06 |
| 2017/0180135 A1* | 6/2017 | Hodroj .................. H04L 9/3247 |
| 2017/0272267 A1 | 9/2017 | Köhler |
| 2019/0387396 A1* | 12/2019 | Gui .......................... H04W 8/20 |

OTHER PUBLICATIONS

U.S. Appl. No. 15/592,492, filed May 11, 2017, Slupesky et al.
U.S. Appl. No. 15/939,672, filed Mar. 29, 2018, Zhang.

* cited by examiner

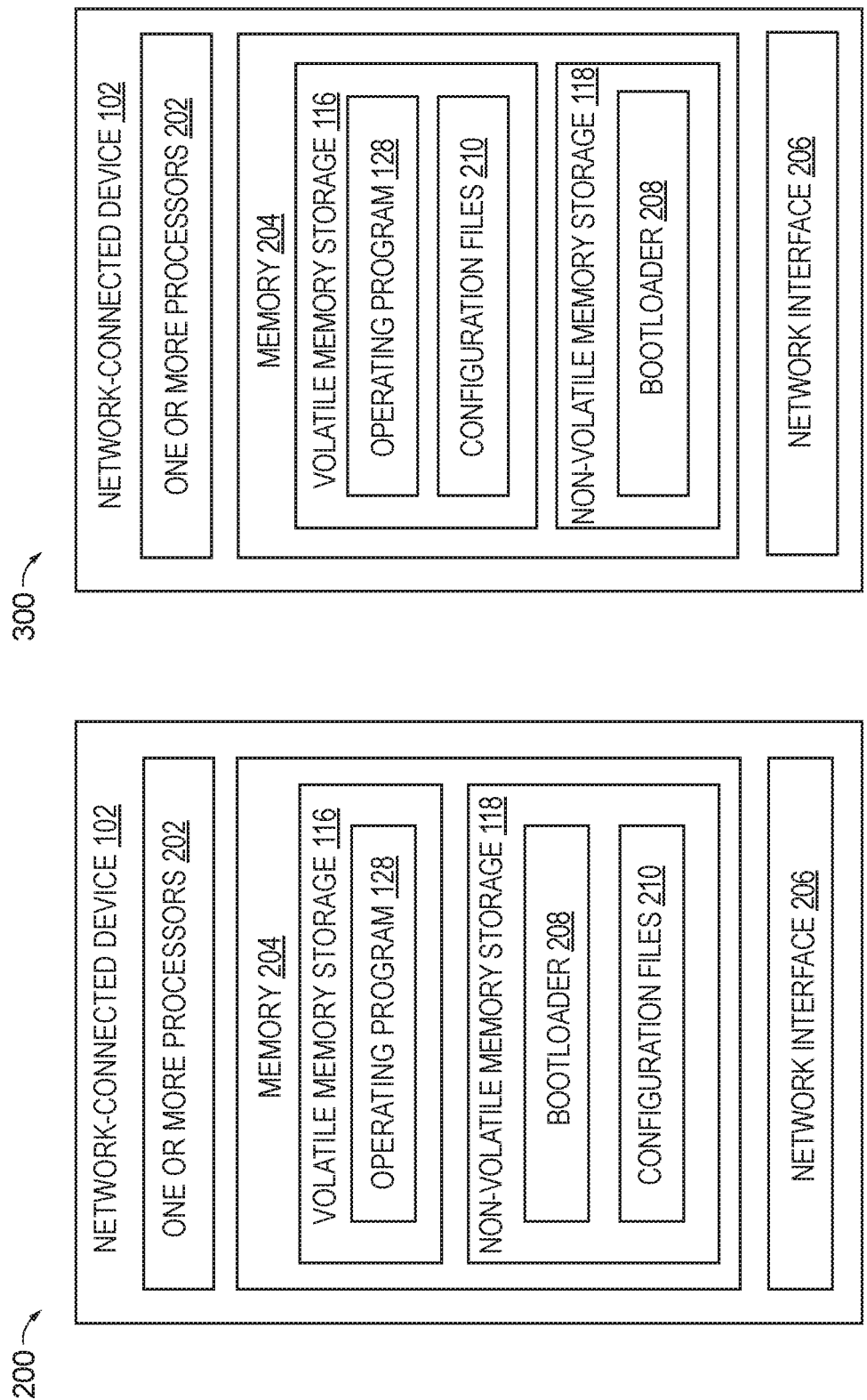

NETWORK-CONNECTED COMPUTING DEVICES AND METHODS FOR EXECUTING OPERATING PROGRAMS IN RAM MEMORY

FIELD

The present disclosure relates to network-connected devices having limited persistent memory.

BACKGROUND

Because forms of persistent memory storage are expensive, many computing devices are designed to only include minimal amounts of persistent memory storage. For example, in limited functionality devices such as routers, the amount of persistent memory storage built into the device is limited to little more than the amount required to enable the device to execute necessary operating programs.

While this reduces the cost of building such a device, having a limited amount of persistent memory storage makes devices susceptible to becoming obsolete. For example, as functionalities are added and/or enhanced in the operating programs of a device, the amount of persistent memory storage required to store the operating programs increases. Additionally, it is often not economically practical to update the persistent memory storage capacity of a device. This means that, over time, owners of computing devices with limited persistent memory storage can be faced with the choice of purchasing a new device with more persistent memory, or executing old and/or out of date software on their current device.

SUMMARY

Network-connected computing devices and methods for executing operating programs stored in a RAM-based file storage system are disclosed herein.

Network-connected devices for executing operating programs stored in a RAM-based file storage system include one or more processors, a random access memory (RAM), and a persistent memory storage (i.e., persistent memory). The persistent memory storage includes a bootloader that, when executed by the processor during a boot of the network-connected devices, causes the network-connected devices to connect to an external computing device via a network and to download an operating program from the external computing device. The network-connected devices then store some or all of the operating program in a RAM-based file storage system stored in the RAM memory, and execute the operating program from within the RAM-based file storage system. In some embodiments, the network-connected devices also are configured to store configuration files in the RAM-based file storage system, to make changes to the configuration files stored in the RAM-based file storage system, and/or to synchronize those changes with a persistent file store hosted by an external computing device.

Methods for executing operating programs stored in a RAM-based file storage system stored in the RAM memory of a network-connected device include booting the network-connected device, and responsive to the booting, executing a bootloader stored in the persistent memory of the network-connected device. The methods further include connecting to an external computing device over a network and downloading an operating program from the external computing device. The methods also include storing the operating program in the RAM-based file storage system and executing the operating program from within the RAM-based file storage system.

This Summary is provided to introduce a selection of aspects of the present disclosure in a simplified form that is further described in more detail below in the Description. This Summary is not intended to limit the scope of the claimed subject matter or to identify features that are essential to the claimed subject matter.

BRIEF DESCRIPTION OF THE DRAWINGS

FIG. 2 is a schematic drawing illustrating an example system for executing operating programs stored in a RAM-based file storage system of a network-connected computing device, according to the present disclosure.

FIG. 3 is a schematic drawing illustrating an example system for executing operating programs stored in a RAM-based file storage system of a network-connected computing device in which the configuration files are stored in volatile memory storage, according to the present disclosure.

DESCRIPTION

Figure 1:
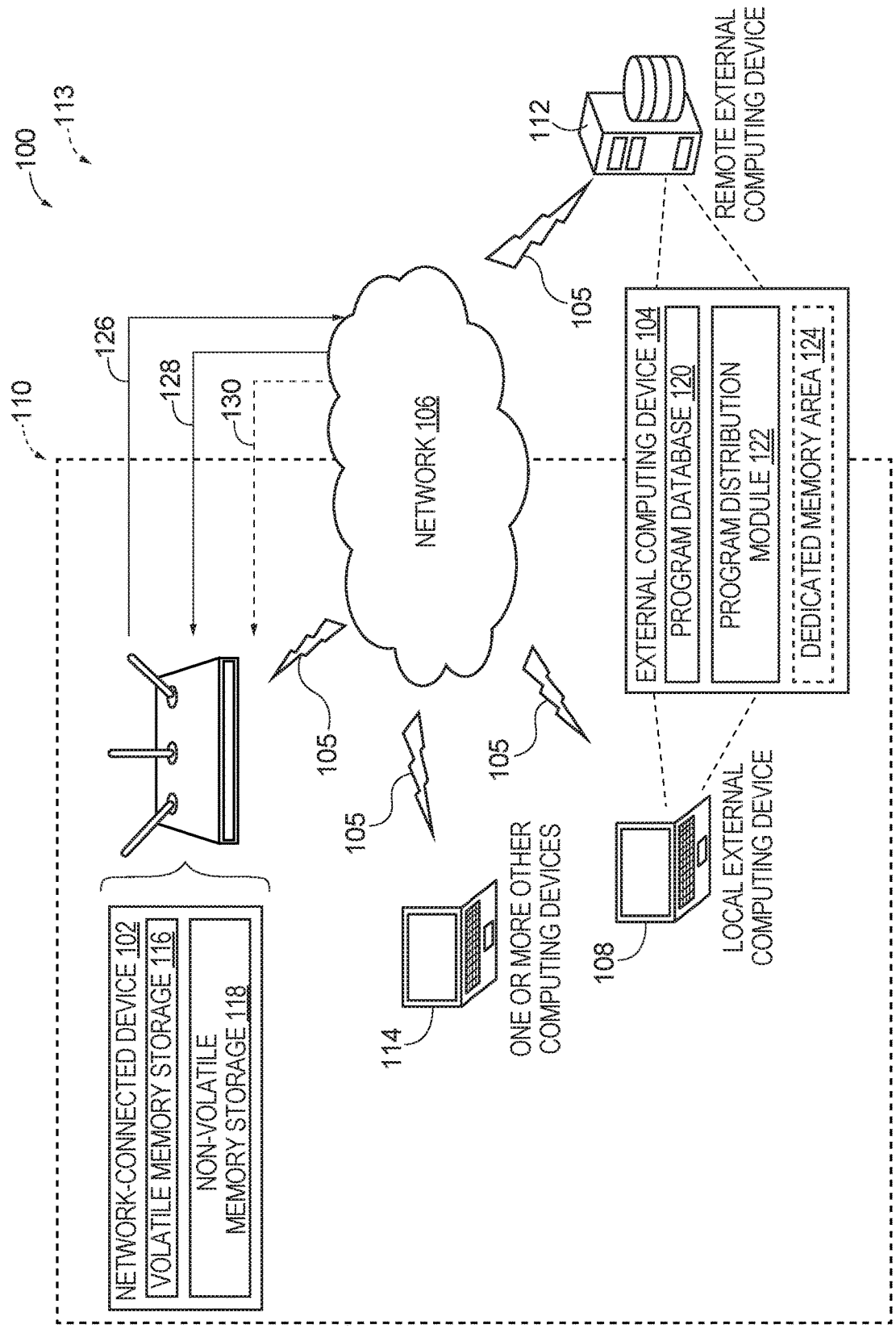
FIG. 1 is a schematic drawing of example environments that illustrate techniques for executing operating programs stored in a RAM-based file storage system of a network-connected computing device, according to the present disclosure.

This application describes techniques for executing operating programs stored in a random access memory (RAM)-based file system of a network-connected computing device. By utilizing these techniques, network-connected devices that have limited persistent memory storage resources are able to execute operating programs while reducing and/or eliminating the requirement to store code for the operating programs in the persistent memory of the network-connected device. In this way, by use of the techniques, network-connected devices having limited persistent memory storage capacities are able to execute operating programs that they would not have the persistent memory capacity to store using prior techniques.

FIGS. 1-7 illustrate examples of computing systems, network-connected computing devices, and methods for executing operating programs stored in a RAM-based file storage system. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or utilized with any of the figures without departing from the scope of the present disclosure.

FIG. 1 is schematic drawing of example environments 100 that illustrate techniques for executing operating programs stored in a RAM-based file storage system of a network-connected computing device, according to the present disclosure. Additional details of individual operations illustrated in FIG. 1 and discussed below are described in more detail with reference to subsequent figures.

The environment 100 includes a network-connected device 102. Network-connected device 102 may include many different types of electronic devices, including but not limited to, a personal computer, a laptop computer, a tablet computer, a computing appliance (e.g., a router, gateway, switch, bridge, repeater, hub, protocol converter, etc.), a smart appliance, a switch, an internet-of-things appliance, a portable digital assistant (PDA), a smartphone, a wearable computing device, an electronic book reader, a game console, a set-top box, a smart television, a portable game player, a portable media player, and so forth. In some embodiments, network-connected device 102 is a computing device with a limited non-volatile memory storage 118 capacity. For example, network-connected device 102 may correspond to a network router or an internet-of-things (IoT) device that includes electronics, software, sensors, actuators, and/or network connectivity that allows the network-connected device 102 to exchange data 105 over a network 106. The network-connected device may include a non-volatile memory storage capacity sufficient to enable the network-connected device 102 to provide a basic suite of functionalities.

The network-connected device 102 may be in communication with an external computing device 104 via network 106. Examples of network 106 include the internet, a wide area network, a local area network, or a combination thereof. Network 106 may be a wired network, a wireless network, or both. In some embodiments, external computing device 104 may be a local external computing device 108 that is in communication with network-connected device 102 over a local area network 110 such as a wireless local area network (WLAN). In some embodiments, the external computing device 104 may correspond to a remote external computing device 112, such as a cloud server, that is in communication with the network-connected device 102 over a wide area network 113, such as the internet. The environment further may optionally include one or more (i.e., at least one) other computing devices 114 (i.e., laptops, tablets, smartphones, gaming consoles, etc.) that may be in communication with the network-connected device 102 via the network 106.

FIG. 1 illustrates the network-connected device 102 as including volatile memory storage 116 and non-volatile memory storage 118. Volatile memory storage 116 (otherwise known as volatile memory, volatile storage, or temporary memory) is a type of computer memory that needs power to preserve stored data. That is, if network-connected device 102 is switched off or rebooted, anything stored in volatile memory storage 116 is removed and/or deleted. Volatile memory storage 116 often is less expensive than non-volatile memory storage 118. In addition, the network-connected device 102 often may more quickly access data stored in the volatile memory storage 116 than data stored in non-volatile memory storage 118. Examples of volatile memory storage 116 include RAM, Dynamic RAM (DRAM), double data rate synchronous dynamic RAM (DDR SDRAM), static RAM (SRAM), etc.

Non-volatile memory storage 118 (otherwise known as non-volatile memory, non-volatile storage, persistent memory, or persistent memory storage) is a type of computer memory that has the capability to hold saved data even if the power is turned off, and non-volatile memory storage 118 thus does not need to be periodically refreshed. That is, unlike volatile memory storage 116, data that is stored in a non-volatile memory storage 118 is not lost when network-connected device 102 is turned off, rebooted, etc. Examples of non-volatile memory storage 118 include read-only memory (ROM) (e.g., mask ROM (MROM), programmable ROM (PROM), erasable programmable ROM (EPROM), electrically erasable programmable ROM (EEPROM), etc.), flash memory, solid-state storage, ferroelectric RAM (FRAM), magnetic tape, hard disk drives, optical disc drives, etc. Non-volatile memory storage 118 typically is slower than volatile memory storage 116 (i.e., it takes more time for network-connected device 102 to access data stored in non-volatile memory storage 118 than data stored in volatile memory storage 116), and faster types of non-volatile memory storage 118 often are expensive. Accordingly, to keep costs down, many network-connected devices 102 are designed to have a limited non-volatile memory storage 118 capacity.

FIG. 1 illustrates the external computing device 104 as hosting a program database 120 and a program distribution module 122 on a memory accessible to the external computing device 104. The program database 120 corresponds to a stored collection of coded instructions, such as software modules, software applications, software programs, operating programs, program layers, software products, disk images, system images, process images, operating systems, and/or other coded instructions that, when individually executed on the network-connected device 102, cause the network-connected device 102 to perform one or more desired functionalities. For example, the program database 120 may store a filtering program that, when executed on a network-connected router, causes the network-connected router to filter data that is passed to and/or from individual other computing devices 114, user accounts, or a combination thereof.

The program distribution module 122 may manage the distribution of the coded instructions stored in the program database 120 to corresponding network-connected devices 102. For example, the program distribution module 122 may select a combination of one or more coded instructions stored in the program database 120 that an individual network-connected device 102 is to receive, and/or prepare the combination of one or more coded instructions for transmission to, and execution on, the network-connected device 102.

FIG. 1 also illustrates the external computing device 104 as optionally including a dedicated memory area 124. Dedicated memory area 124 may be associated with the network-connected device 102 and/or may store files, statistics, programs, configurations, usage data, or other information associated with the network-connected device 102, and/or associated with one or more users associated with the network-connected device 102. Users associated with the network-connected device 102 may include individuals that use, own, or otherwise interact with the network-connected device, such as the device owners, family members, account holders, users, etc. In some embodiments, the external computing device 104 hosts a unique dedicated memory area 124 for each separate network-connected device 102 to which the external computing device 104 is configured to distribute operating programs and/or other files, such as configuration files.

FIG. 1 further illustrates an example of a process that may be utilized to execute operating programs stored in a random access memory (RAM)-based file system of a network-connected device 102. This process may be initiated by the occurrence of a triggering event. For example, the process may be initiated by one or more of an initialization of the network-connected device 102 (i.e., a boot of the network-connected device 102), a reboot of the network-connected device 102, an input received by the network-connected device 102 (e.g., a signal from external computing device 104 and/or other computing device 114, an input received from an interface incorporated into or otherwise associated with the network-connected device 102, etc.). In some embodiments, the process may be initiated by a bootloader stored within a root file system of the network-connected device 102, where the bootloader is configured to be executed during a boot process of the network-connected device 102.

The process may include the network-connected device 102 transmitting to the external computing device 104 a request 126 for an operating program 128. For example, where the network-connected device 102 is an IoT device, the request 126 may correspond to a request for an operating program 128 that, when executed by the IoT device, causes the IoT device to perform one or more computing processes. In an alternative example, where the network-connected device 102 is an internet router device, the request 126 may correspond to a request for an operating program 128 that, when executed by the internet router device, causes the internet router device to route data traffic between one or more other computing devices 114 and network 106, filter such traffic, or perform one or more other computing processes that the internet router device does not itself persistently store code to perform. In some embodiments, the network-connected device 102 may not store coding instructions that are necessary to perform the one or more computing processes on the non-volatile memory storage 118. In such embodiments, the network-connected device 102 must first acquire the necessary coding instructions from external computing device 104 before network-connected device 102 is able to perform the one or more computing processes.

In some embodiments, transmitting request 126 may include connecting to the external computing device 104, and/or verifying the connection to the external computing device 104. Connecting to the external computing device 104 may include establishing a connection between the network-connected device 102 and the external computing device 104 through which data may be passed between the two devices. In some embodiments, the connection may be wired and/or wireless connection with a local external computing device 108 in a local area network 110 of the network-connected device 102. Alternatively, the connection may be a wired and/or wireless connection with a remote external computing device 112 via a wide area network 113 such as the internet. In some embodiments, the connection may include an encrypted channel that allows secure data transmission between the network-connected device 102 and the external computing device 104. Authenticating the connection may include transferring to or otherwise exchanging authentication credentials with the external computing device 104. For example, in some embodiments the request 126 includes authentication credentials such as a username, a password, a token, a digital certificate, and/or other identifiers that authenticate the network-connected device 102, an associated account, or a combination thereof.

The process illustrated in FIG. 1 further includes the network-connected device 102 receiving one or more operating programs 128 from the external computing device 104. The operating program 128 is a collection of one or more software modules, software applications, software programs, program layers, software products, disk images, system images, process images, operating systems, and/or other coded instructions that, when executed on the network-connected device 102, cause the network-connected device 102 to perform one or more desired functionalities. In some embodiments, the operating program 128 may include a selection of software modules that, when executed on the network-connected device 102, cause the network-connected device 102 to perform computing functions that enable it to act as an IoT device. For example, where the network-connected device 102 is a smart thermostat, the operating program 128 may include a software module that causes the smart thermostat to monitor temperature readings, a software module for controlling a furnace associated with the smart thermostat, a software module for displaying information on a graphical user interface, etc. As another example, where the network-connected device 102 is an internet router device, the operating program 128 may include a software module that causes the internet router device to filter network traffic between individual computing devices of the one or more other computing devices 114 (e.g., parental control program).

In some embodiments, based upon the external computing device 104 receiving the request 126, the program distribution module 122 assembles the operating program 128 from the coded instructions stored in program database 120. For example, the program distribution module 122 may assemble the operating program 128 based on a schedule that indicates one or more combinations of coded instructions stored in the program database that are to be distributed to corresponding network-connected devices 102. The schedule may indicate the one or more combinations of coded instructions that are to be distributed based on the type of network-connected device 102, the model of the network-connected device 102, a user account associated with the network-connected device 102, a location of the network-connected device (i.e., GPS location, IP address, etc.), a service subscription associated with the network-connected device 102, or a combination thereof. For example, based upon the network-connected device 102 being a router for which an associated user account obtained a family filtering service, the program distribution module 122 may assemble the operating program 128 to include a software program for filtering content items (e.g., websites, images, language, videos, software, etc.) and/or one or more software modules that provide functionalities included in the family filtering service.

The program distribution module 122 also may compress and/or encrypt the operating program 128 before transferring the operating program 128 to the network-connected device 102 over network 106. The operating program 128 transferred to the network-connected device 102 may include binary program code for operating program 128.

Alternatively, or in addition, the operating program 128 may correspond to an executable image, such as a system image, that the network-connected device 102 may store and execute within the volatile memory storage 116.

Once the network-connected device 102 receives the operating program 128, the network-connected device 102 stores the operating program 128 in the volatile memory storage 116. This may involve the network-connected device 102 decompressing and/or decrypting the operating program 128. In some embodiments, the network-connected device 102 may validate the integrity of the operating program 128. For example, the network-connected device 102 may validate the operating program 128 based on a downloaded digital signature, a downloaded hash checksum, etc.

The network-connected device 102 then executes the operating program 128 stored in the volatile memory storage 116. By storing and executing the operating program 128 in the volatile memory storage 116, the network-connected device 102 of the present disclosure is enabled to provide computing functionalities associated with the operating program 128 without having to store the operating program 128 itself in the non-volatile memory storage 118. In this way, the techniques disclosed herein reduce the amount of non-volatile memory storage 118 that is required for a network-connected device 102 to provide the computing functionalities. Additionally, the techniques disclosed herein enable a network-connected device 102 to execute operating programs 128 that are otherwise too large to be stored on the non-volatile memory storage 118 due to size or availability of memory on the non-volatile memory storage 118. As discussed above, not only does this reduction in persistent storage requirements (i.e., not requiring that operating programs 128 be stored on the non-volatile memory storage 118) reduce the cost of manufacturing network-connected devices 102, but also it may prevent legacy devices with limited non-volatile memory storage 118 from becoming obsolete.

In some embodiments, executing the operating program 128 stored in the volatile memory storage 116 may include accessing files and/or software instructions stored on the non-volatile memory storage 118. For example, executing the operating program 128 may include executing software code stored in the non-volatile memory storage 118 that is associated with the operating program 128. In another example, the network-connected device 102 may store configuration files, or other necessary files for the operation of the operating program 128, in the non-volatile memory storage 118. Alternatively, or in addition, the external computing device 104 may host computing files 130 in the dedicated memory area 124, and the network-connected device 102 may obtain the computing files 130 from the external computing device 104 over network 106. Computing files 130 may correspond to program files, program statistics, configuration files, usage data, or other information associated with the network-connected device 102, and/or one or more users associated with the network-connected device 102. For example, one or more of the configuration files and/or necessary files may be stored on the volatile memory storage 116 of the network-connected device 102, and the files may be synchronized periodically with a persistent file store hosted by the external computing device 104. The persistent file store may be stored in a dedicated memory area 124 associated with the external computing device 104.

According to the present disclosure, the network-connected device 102 periodically may transmit a request 126 for a new operating program 128. For example, the network-connected device 102 may transfer such a request 126 in response to a new boot event (e.g., the device is rebooted or turned on), an input received by the network-connected device 102 (e.g., wireless input, physical input, etc.), or other triggering events. For example, the network-connected device 102 may include a module stored on the non-volatile memory storage 118 that causes the network-connected device 102 to transmit a new request 126 based on a schedule, a time since the last operating programs 128 were obtained, a historical usage record of the network-connected device 102, etc. In some embodiments, the operating programs 128 obtained in response to new requests 126 may be updated versions of the operating programs 128. Alternatively, or in addition, the program distribution module 122 may transmit a different operating program 128 based on the time of the request 126, a user account associated with the request 126, a change in a service subscription associated with the network-connected device 102, or a combination thereof.

FIGS. 2-3 are schematic diagrams illustrating example systems 200-300 for executing operating programs stored in a RAM-based file storage system of a network-connected computing device. FIG. 1 illustrates a generalized system and conceptual flow of operations including transmitting a request 126 from a network-connected device 102 to an external computing device 104, transmission of operating program 128 to the network-connected device 102, and subsequent storage and execution of the operating program in the volatile memory storage 116 of the network-connected device 102. FIGS. 2-3 illustrate additional details of hardware and software components that may be utilized to implement such techniques. The systems 200-300 are merely two examples, and the techniques described herein are not limited to performance using the systems 200-300 of FIGS. 2-3. Accordingly, any of the details of network-connected device 102 described or depicted with regard to FIGS. 2-3 may be utilized within environment 100 of FIG. 1, and any of the details described or depicted with regard to network-connected device 102 within environment 100 of FIG. 1 may be utilized by one or more of network-connected devices 102 of FIGS. 2-3.

According to the present disclosure, network-connected device 102 may correspond to a personal computer, a laptop computer, a tablet computer, a computing appliance (e.g., a router, gateway, switch, bridge, repeater, hub, protocol converter, etc.), a smart appliance, a switch, an internet-of-things appliance, a portable digital assistant (PDA), a smartphone, a wearable computing device, an electronic book reader, a game console, a set-top box, a smart television, a portable game player, a portable media player, or other type of electronic device. In FIGS. 2-3, the network-connected device 102 includes one or more (i.e., at least one) processors 202, memory 204 communicatively coupled to the one or more processors 202, and a network interface 206.

Network-connected device 102 may include volatile memory storage 116 and non-volatile memory storage 118. According to the present disclosure, the volatile memory storage 116 may include any type of computer memory that needs power to preserve stored data, such that if network-connected device 102 is switched off, rebooted, etc., then anything stored in the volatile memory storage is removed or deleted (e.g., RAM, DRAM, DDR SDRAM, SRAM, etc.). Additionally, the non-volatile memory storage 118 may include any type of computer memory that has the capability to hold saved data even if the power is turned off, and which does not need to be periodically refreshed (e.g., ROM, flash memory, solid-state storage, ferroelectric RAM, magnetic tape, hard disk drives, optical disc drives, etc.).

The network-connected device 102 includes a bootloader 208 stored in the non-volatile memory storage 118. Bootloader 208 is a piece of computing code that is executed by the network-connected device 102 upon initiation of the device (i.e., on power up, reboot, etc.) and before any operating system is running. For example, the bootloader 208 may be written as a small program routine (i.e., stub code) in a root file system of the non-volatile memory storage 118 of the network-connected device 102. The bootloader 208 may be downloaded from external computing device 104, installed by a user of the network-connected device 102, and/or installed during the manufacturing/sales process of the network-connected device 102.

The bootloader 208 is written to enable the network-connected device 102 to be able to connect to the external computing device 104 such that data may pass between the two devices, validate the connection with the external computing device 104, transmit a request 126 for operating program 128, acquire operating program 128 from the external computing device 104, store the operating program 128 on the volatile memory storage 116 of the network-connected device 102, decompress the operating program 128, decrypt the operating program 128, validate the operating program 128, execute the operating program 128 as stored in the volatile memory storage 116, or a combination thereof. This is illustrated in FIG. 1 and discussed herein with reference thereto. For example, where the network-connected device 102 is a router device, upon initiation of the router device the bootloader 208 may cause the router device to connect to an external computing device 104 and to transmit a request for operating program 128 that, when executed by the one or more processors 202, causes the router device to perform one or more router functionalities, such as filtering and/or forwarding content between a network 106 and other computing devices (e.g., the one or more other computing devices 114).

The bootloader 208 also may be configured to receive the operating program 128 from the external computing device 104. In some embodiments, the bootloader 208 may validate the integrity of the operating program 128 downloaded from the external device. For example, the bootloader 208 may validate a downloaded operating program 128 by generating a digital signature and/or hash checksum for the downloaded operating program 128, and by comparing the generated digital signature and/or hash checksum to a digital signature and/or hash checksum that was downloaded from the external computing device 104 in association with the operating program 128. In some embodiments, the bootloader 208 also may cause the network-connected device 102 to decompress and/or decrypt the operating program 128.

The operating program 128 is then stored in the volatile memory storage 116 of the network-connected device 102. For example, the operating program 128 downloaded from the external computing device 104 may be stored within a RAM-based file storage system that is stored in a RAM memory of the network-connected device 102. That is, the network-connected device 102 may store the operating program 128 in a simulated disk drive that resides in the RAM memory of the network-connected device 102. Network-connected device 102 then executes the operating program 128 as it is stored in the volatile memory storage 116. For example, the operating program 128 stored in the volatile memory storage 116 may correspond to binary program code for operating program 128. Alternatively, or in addition, the operating program 128 as stored in the volatile memory storage 116 may correspond to an executable image, such as a system image, that when executed by the one or more processors 202, causes the network-connected device 102 to perform a set of desired computing functionalities.

Executing the operating program 128 stored in the volatile memory storage 116 may include accessing configuration files 210. In various embodiments, the configuration files 210 may correspond to data files that specify parameters and/or settings for the operating program 128. FIG. 2 depicts the non-volatile memory storage 118 as including one or more configuration files 210. That is, FIG. 2 depicts an example network-connected device 102 that is configured to store configuration files 210 locally in the non-volatile memory storage 118 for an operating program 128 that is stored remotely.

FIG. 3 depicts a network-connected device 102 in which the configuration files 210 are stored in the volatile memory storage 116. In such an embodiment, the bootloader 208 may be configured to obtain the configuration files 210 from the external computing device 104. For example, request 126 may include a request for configuration files 210. Alternatively, the bootloader 208 and/or operating program 128 may cause the network-connected device 102 to transmit an additional request to the external computing device 104 for the configuration files 210. The configuration files 210 may be downloaded to the network-connected device 102 and from the external computing device 104. The configuration files 210 may be downloaded to the network-connected device 102 in a compressed and/or encrypted form. The network-connected device 102 then decompresses, decrypts, and/or stores the configuration files 210 in the volatile memory storage 116. For example, the network-connected device 102 may store the configuration files in the RAM-based file storage system that is stored in the RAM memory of the network-connected device 102.

In some embodiments, the external computing device 104 may store a copy of the configuration files 210 in non-volatile memory storage 118. In such embodiments, the network-connected device 102 may keep a record of all changes made to the configuration files 210 and may transmit the record of changes to the external computing device 104 to ensure that the copy stored in the non-volatile memory storage is synchronized with the configuration files 210 stored in the volatile memory storage 116 of the network-connected device 102.

Figure 4:
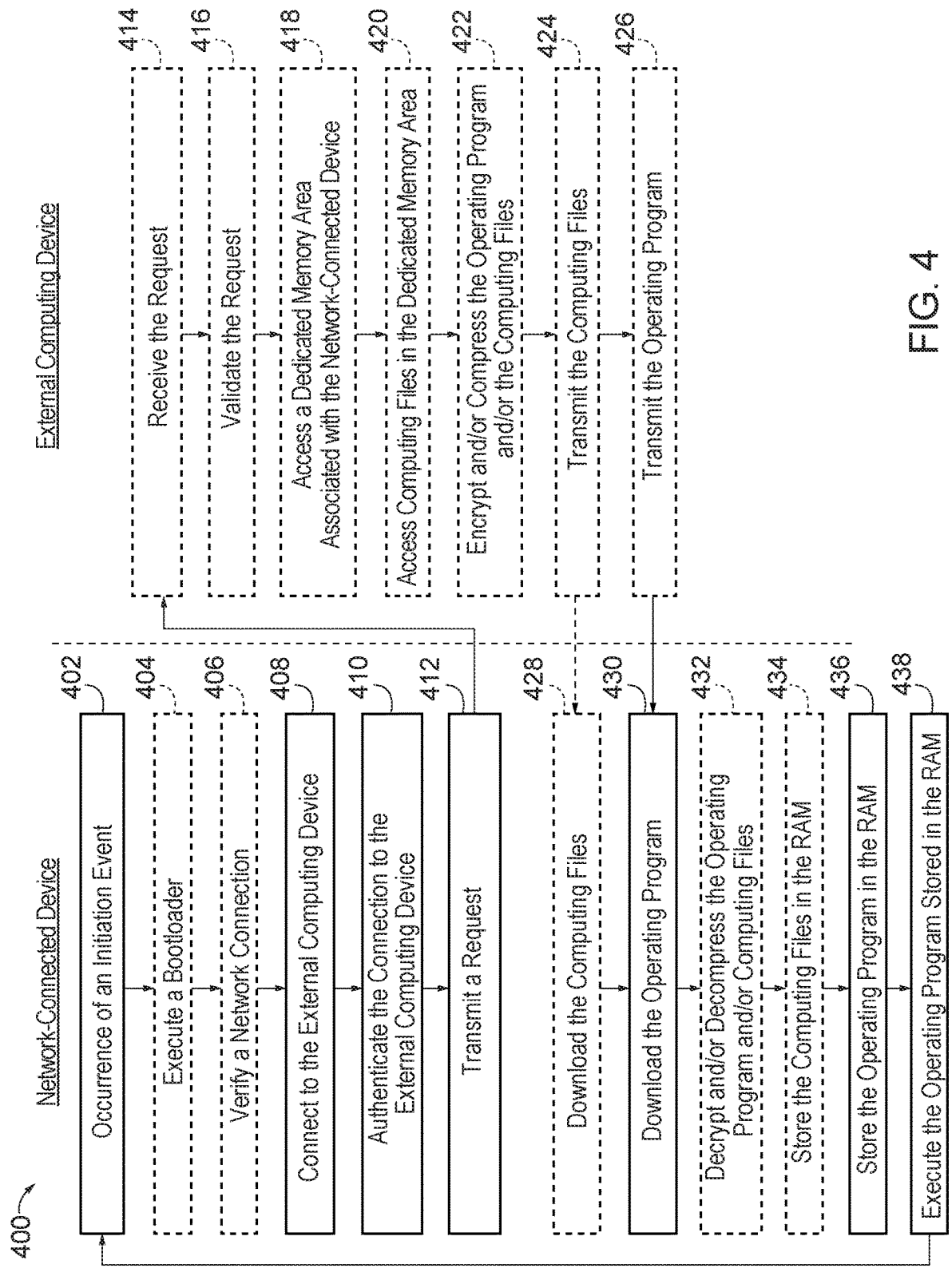
FIG. 4 is a flowchart depicting examples of methods for executing operating programs stored in a RAM-based file storage system of a network-connected computing device, according to the present disclosure.
Figure 5:
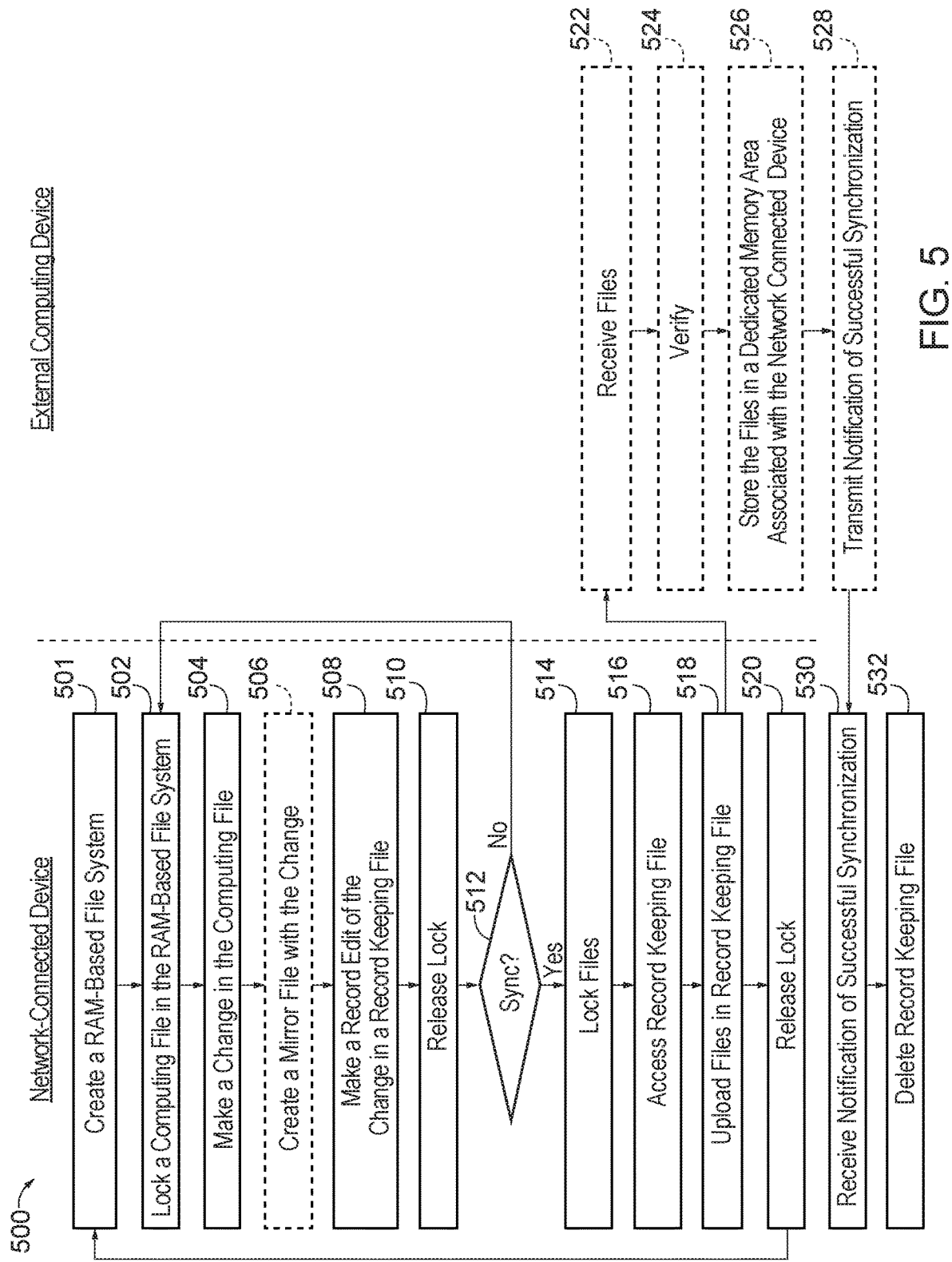
FIG. 5 is a flowchart depicting examples of methods for synchronizing files stored in a RAM-based file storage system with files stored in a remote persistent file store, according to the present disclosure.
Figure 7:
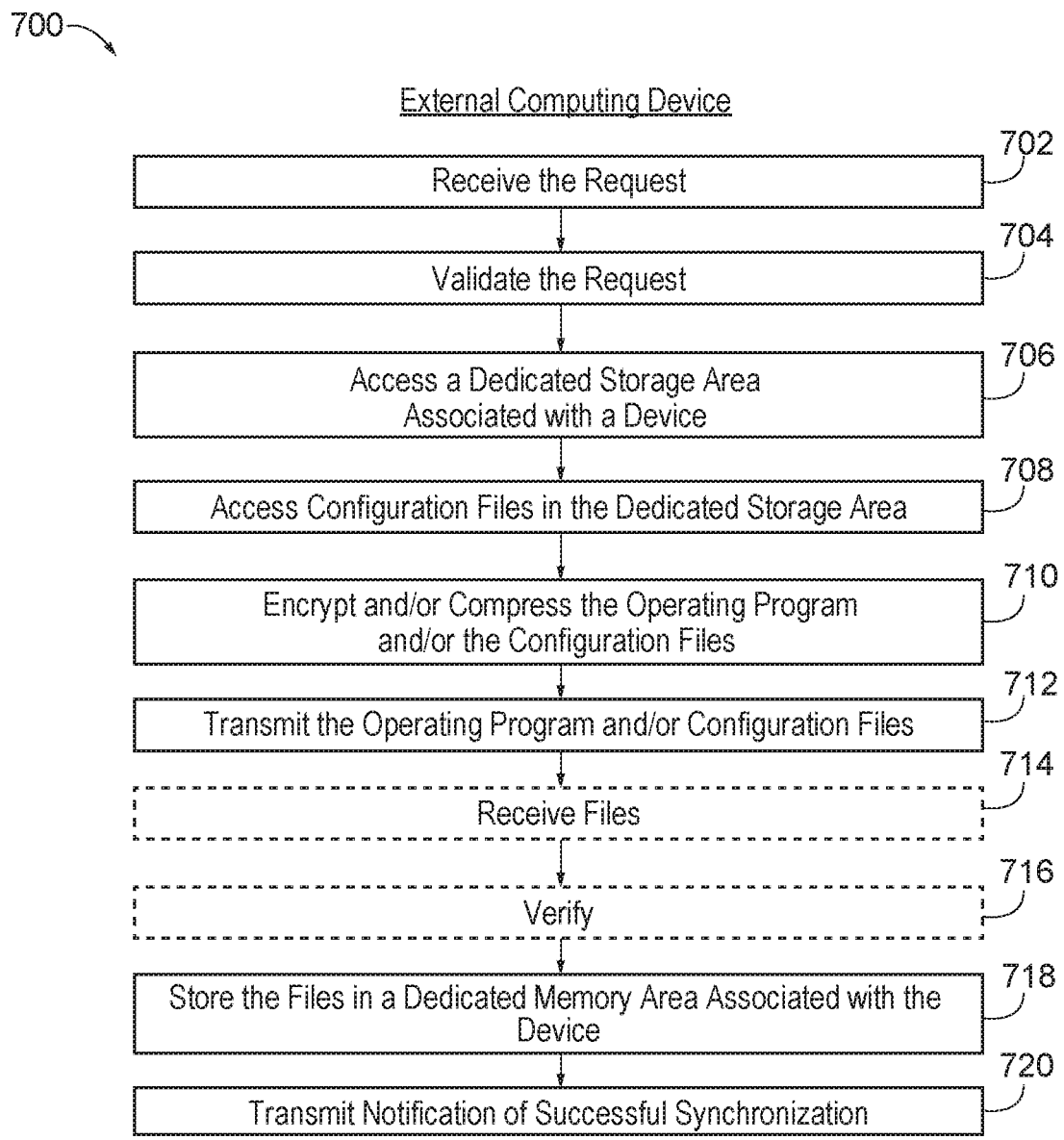
FIG. 7 is a flowchart depicting examples of methods for hosting a remote persistent file store service for network-connected devices that utilize a RAM-based file storage system, according to the present disclosure.

FIGS. 4, 5, and 7 schematically provide flowcharts that represent examples of methods according to the present disclosure. In FIGS. 4, 5, and 7, some steps are illustrated in dashed boxes indicating that such steps may be optional or may correspond to an optional version of a method according to the present disclosure. That said, not all methods according to the present disclosure are required to include the steps illustrated in dashed boxes. Additionally, the order of steps illustrated in FIGS. 4, 5, and 7 is exemplary, and in different embodiments the steps in FIGS. 4, 5, and 7 may be performed in a different order. The methods and steps illustrated in FIGS. 4, 5, and 7 are not limiting, and other methods and steps are within the scope of the present disclosure, including methods having greater than or fewer than the number of steps illustrated, as understood from the discussions herein.

FIG. 4 is a flowchart depicting methods 400, according to the present disclosure, for executing operating programs stored in a RAM-based file storage system of a network-connected device. As shown in FIG. 4, at operation 402, an initiation event occurs in association with the network-connected device. The initiation event may correspond to an initialization of the computerized structure of the network-connected device (i.e., a boot of the network-connected device), a reboot of the network-connected device, and/or an input received by the network-connected device (e.g., a signal from an external computing device and/or other computing device, a input received from an interface incorporated into or otherwise associated with the network-connected device, etc.).

At operation 404, the network-connected device may execute a bootloader. The bootloader may correspond to a piece of computing code that is executed by the network-connected device upon initiation of the device (i.e., on power up, reboot, etc.) and before any operating system is running. For example, the bootloader may be written as a program routine (i.e., stub code) in a root file system of the non-volatile memory storage of the network-connected device. The bootloader may be downloaded from the external computing device, installed by a user of the network-connected device, and/or installed during the manufacturing/sales process of the network-connected device.

At operation 406, the network-connected device optionally may verify a network connection. At operation 408, the network-connected device connects to the external computing device. For example, the network-connected device may verify that it has a connection to a network, and then connect to the external computing device via the network. In some embodiments, the connection may be a wired and/or wireless connection with a local external computing device in a local area network of the network-connected device. As another example, the connection may be a wired and/or wireless connection with a remote external computing device via a wide area network such as the internet.

At operation 410, the network-connected device authenticates the connection to the external computing device. Authenticating the connection may include transferring to, or otherwise exchanging, authentication credentials with the external computing device. For example, the authentication request may include authentication credentials such as a username, a password, a token, a digital certificate, and/or other identifiers that authenticate the network-connected device, an associated account, or a combination thereof.

At operation 412, the network-connected device transmits a request to the external computing device. The request may correspond to a request for one or more operating programs that, when executed by the network-connected device, cause the network-connected device to perform one or more computing processes. The network-connected device may not store coding instructions that are necessary to perform the one or more computing processes on the non-volatile memory storage. In some embodiments, the request includes authentication credentials such as a username, a password, a token, digital certificate, and/or other identifiers that authenticate the network-connected device, an associated account, or a combination thereof. Alternatively, or in addition, the request may include a request for computing files. Computing files may correspond to program files, program statistics, usage data, or other information associated with the network-connected device, the operating program, and/or one or more users associated with the network-connected device. In an embodiment where computing files associated with the operating program are stored in non-volatile memory storage by the external computing device, transmitting the request may include the network-connected device transmitting a separate request to the external computing device for the computing files.

At operations 414 and 416, the external computing device may receive the request from the network-connected device and validate the request. Validating the request may include comparing one or more authentication credentials such as a username, a password, a token, a digital certificate, and/or other identifiers that are included with the request to known authentication credentials for the network-connected device.

At operations 418 and 420, the external computing device optionally may access a dedicated memory area associated with the network-connected device, and may access computing files in the dedicated memory area. The external computing device may access the dedicated memory area in response to the request including a request for computing files. In some embodiments, the dedicated memory area is a non-volatile memory storage that is accessible to the external computing device and which is reserved for data associated with the network-connected device. For example, the dedicated memory area may store files, statistics, programs, configurations, usage data, or other information associated with the network-connected device, and/or one or more users associated with the network-connected device. In some embodiments, the external computing device hosts a unique dedicated memory area for each separate network-connected device to which the external computing device is configured to distribute operating programs and/or other files, such as computing files.

At operation 422, the external computing device may encrypt and/or compress the operating program and/or the computing files. The external computing device may encrypt the operating program and/or the computing files using one of an asymmetric encryption algorithm, a symmetric encryption algorithm, a block cipher, a cipher algorithm, a stream cipher, etc. At operations 424 and 426, the external computing device may transmit the computing files and/or transmit the operating program.

At operation 428, the network-connected device may download the computing files from the external computing device. At operation 430, the network-connected device downloads the operating program from the external computing device.

At operation 432, the network-connected device may decrypt and/or decompress the operating program and/or computing files. In some embodiments, the network-connected device also may validate the integrity of the operating programs downloaded from the external device. For example, the network-connected device may validate a downloaded operating program by generating a digital signature and/or hash checksum for the downloaded operating program, and by comparing the generated digital signature and/or hash checksum to a digital signature and/or hash checksum that was downloaded from the external device in association with the operating program.

At operation 434, the network-connected device may store the computing files in a RAM memory of the network-connected device. At operation 436, the network-connected device stores the operating program in the RAM memory. The computing files and/or operating program downloaded from the external computing device may be stored within a RAM-based file storage system that is stored in the RAM memory of the network-connected device. For example, the network-connected device may store the computing files and/or operating programs in a simulated disk drive that resides in the RAM memory of the network-connected device.

At operation 438, the network-connected device executes the operating program stored in the RAM memory. For example, the operating program stored in the RAM memory may correspond to an executable image, such as a system image, that when executed causes the network-connected device to perform a set of desired computing functionalities. In some embodiments, executing the operating program includes accessing computing files stored in the RAM memory of the network-connected device, a non-volatile memory storage, or a combination thereof.

FIG. 5 is a flowchart depicting methods 500, according to the present disclosure, for synchronizing files stored in a RAM-based file storage system of a network-connected device with files stored in a remote persistent file store. As shown in FIG. 5, at operation 501, the network-connected device creates the RAM-based file storage system. The RAM-based file storage system corresponds to a file storage system that is located in the RAM memory of the network-connected device or in a simulated disk drive that resides in the RAM memory of the network-connected device. At operation 502, the network-connected device locks a computing file in the RAM-based file storage system. The computing file may correspond to program files, program statistics, configuration files, usage data, or other files associated with one or more of the network-connected device, an operating program executing on the network-connected device, and a user associated with the network-connected device. Locking the computing file corresponds to the network-connected device restricting access to the computing file so that only a single user or process is able to access the computing file during the time period when the computing file is locked. In some embodiments, the network-connected device locks the computing file in response to a program executing on the RAM memory of the network-connected device requesting to open the computing file.

At operation 504, the network-connected device makes a change to the computing file. Making the change to the computing file may include appending new data to the computing file stored within the RAM-based file storage system, deleting the file stored within the RAM-based file storage system, and renaming the file stored within the RAM-based file storage system.

At operation 506, the network-connected device optionally may create a mirror file with the change. The network-connected device creates the mirror file with the change in response to the network-connected device appending new data to the computing file stored within the RAM-based file storage system. For example, in response to the network-connected device appending new data to a computing file stored in the RAM-based file storage system, the network-connected device may create a mirror append file that includes the new data, and the network-connected device may insert the mirror append file into a list of files that contains information that has not yet been updated to the remote persistent file store.

At operation 508, the network-connected device notes the change in a record keeping file. For example, noting the change may include the network-connected device making a record edit to the record keeping file stored within the RAM-based file storage system by adding information that the file stored within the RAM-based file storage system is renamed. The record keeping file includes a list of file edits that have occurred since a last synchronization with the remote persistent file store. Alternatively, or in addition, the list may include the names of files stored in the RAM-based file storage system that have been appended, renamed and/or deleted. The list also may include information that indicates mirror files that included appended information and/or information describing changes to the computing files in the RAM-based file storage system, such as, but not limited to, a type of change, a time of the change, a description of the change, a user account that made the change, a process associated with the change, etc.

At operation 510, the network-connected device releases the lock on the computing file. Releasing the lock on the computing file allows other users and/or programs to access the computing file.

At operation 512, the network-connected device determines whether a synchronization between the files stored in the RAM-based file storage system and the remote persistent file store should occur. This decision may be based on a number of changes that have been made since a last synchronization, an amount of time since the last synchronization, the type of changes that have been made since the last synchronization, whether an input to synchronize has been received (e.g., from a user input, the external computing device, or another computing device, etc.), or a combination thereof. For example, the network-connected device may be configured to synchronize with the remote persistent file store after a set period of time.

If the decision at 512 is "no" (no synchronization should occur) the process returns to operation 502, and the network-connected device locks a new file in the RAM-based file storage system for editing. If the decision at 512 is "yes" (a synchronization should occur) the process continues to operation 514, where the network-connected device locks all files in the RAM-based file storage system.

At operations 516 and 518, the network-connected device accesses the record keeping file and uploads the files identified in the record keeping file to the external computing device that is hosting the remote persistent file store. Uploading the files may include transmitting a synchronization request that identifies the files that have been changed, the types of changes that have been made, information describing the changes, or a combination thereof. In some embodiments, the synchronization request may include an identifier (e.g., username, password, account identifier, network-connected device identification code, etc.) that verifies an identity of the network-connected device and/or indicates the particular remote persistent file store that the network-connected device is requesting to be synchronized. At operation 520, the network-connected device releases the lock, the process returns to operation 502, and the network-connected device locks a new file in the RAM-based file storage system for editing.

At operations 522 and 524, the external computing device may receive the files from the network-connected device and verify the files. In some embodiments, verifying the files may include authenticating one or more of the network-connected device, a user account associated with the network-connected device, and/or the files using one or more identifiers received in the synchronization request.

At operation 526, the external computing device may store the files in a dedicated memory area associated with the network-connected device. The dedicated memory area is a non-volatile memory storage that is accessible to the external computing device and is reserved for data associated with the network-connected device. For example, the dedicated memory area may store files, statistics, programs, configurations, usage data, or other information associated with the network-connected device, and/or one or more users associated with the network-connected device. In some embodiments, the external computing device hosts a unique dedicated memory area for each separate network-connected device to which the external computing device is configured to distribute operating programs and/or other files, such as computing files.

In some embodiments, the external computing device may host a plurality of dedicated memory areas, with each dedicated memory area corresponding to a different network-connected device. For example, as a service the external computing device may provide a persistent storage file backup for a plurality of network-connected devices and/or user accounts that utilize RAM-based file storage systems, with each network-connected device and/or user account having an individual dedicated memory area that contains a persistent file backup of files, statistics, programs, configurations, usage data, or other information associated with the network-connected device, and/or user account.

At operation 528, the external computing device may transmit a notification of successful synchronization, which is received by the network-connected device at operation 530. At operation 532, the network-connected device deletes the record keeping file in response to receiving the notification of successful synchronization. In some embodiments, when the network-connected device uploads the files identified in the record keeping file to the external computing device, the network-connected device stores a copy of the record keeping file in the RAM-based files system and deletes the original record keeping file. In such embodiments, the network-connected device stores new information relating to changes made to files in the RAM-based file storage system after the uploading of the original record keeping file in a new record keeping file. Then, when the network-connected device receives the notification of successful synchronization, the network-connected device deletes the copy of the record keeping file.

Figure 6:
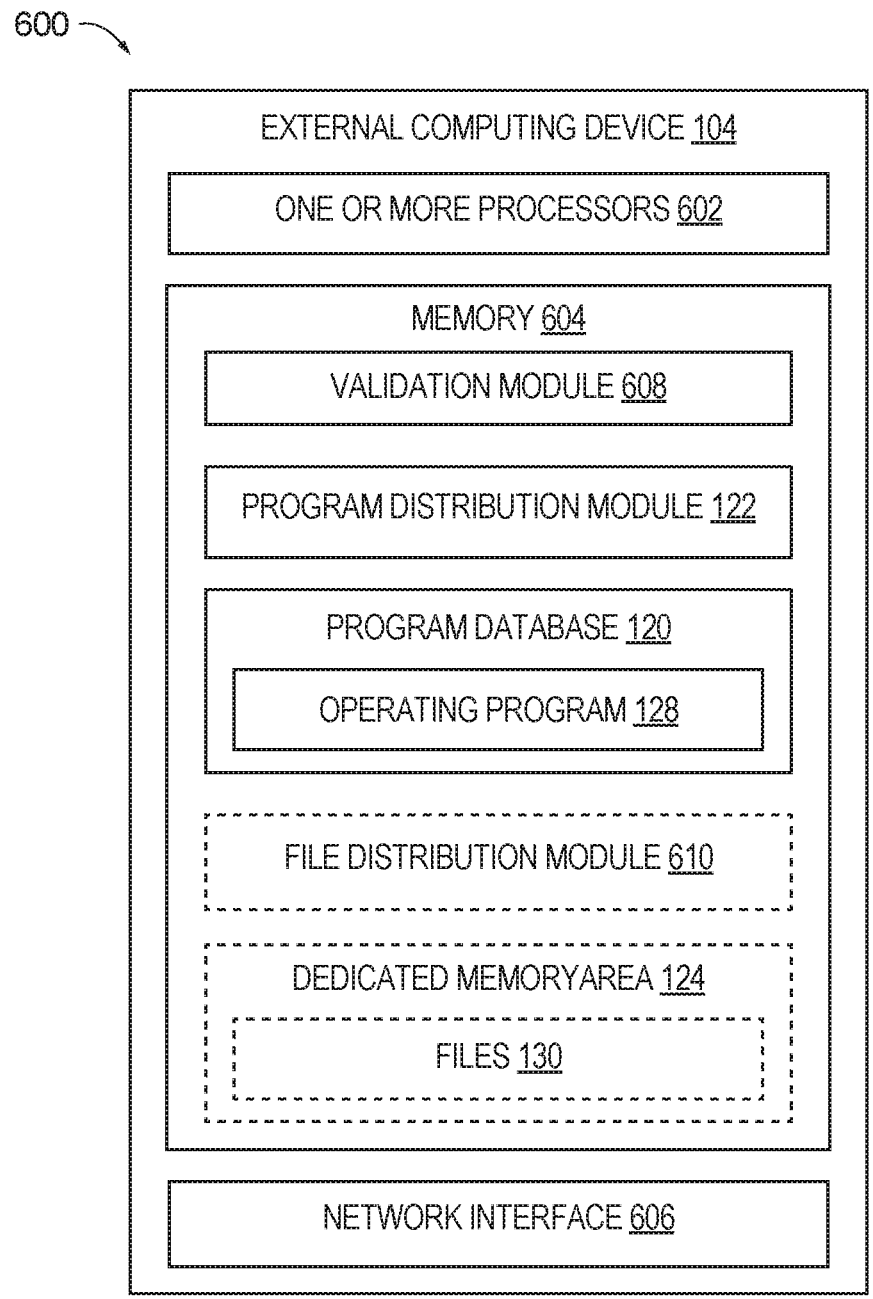
FIG. 6 is a schematic diagram illustrating example systems for hosting a remote persistent file store service for network-connected devices that utilize a RAM-based file storage system, according to the present disclosure.

FIG. 6 is a schematic diagram illustrating an example system 600 for hosting a remote persistent file store service for network-connected devices that utilize a RAM-based file storage system. FIG. 6 illustrates additional details of hardware and software components that may be utilized with environment 100 of FIG. 1, that may be utilized to communicate with systems 200-300 of FIGS. 2-3, and/or that may be utilized to implement techniques and/or methods 400-500 illustrated in FIGS. 4-5. The system 600 is merely an example, and the techniques described herein are not limited to performance using the system 600 of FIG. 6.

According to the present disclosure, external computing device 104 may correspond to any computing device that is connected to network-connected device 102 over a network 106. In various embodiments, the external computing device 104 may correspond to a personal computer, a laptop computer, a tablet computer, a smart appliance, an internet-of-things appliance, a smartphone, one or more server(s), or other type of electronic device. For example, the external computing device 104 may be a server that provides a service to allow network-connected devices 102 to acquire operating programs for storage and execution in a RAM-based file storage system of a network-connected device, and/or synchronize files stored in a RAM-based file storage system of a network-connected device.

In FIG. 6, the external computing device 104 includes one or more processors 602, memory 604 communicatively coupled to the one or more processors 602, and a network interface 606. According to the present disclosure, the memory 604 stores a validation module 608, a program distribution module 122, and a program database 120, which in turn stores an operating program 128. FIG. 6 further illustrates memory 604 as optionally storing a file distribution module 610 and a dedicated memory area 124. The validation module 608 is executable on the one or more processors 602 to cause the external computing device 104 to validate requests from network-connected devices 102, such as is discussed herein with reference to FIGS. 1 and 4-5. This may include validating the identity of a network-connected device 102 and/or authenticating a requesting program or bootloader, and/or a user account. For example, the validation module 608 may validate the network-connected device 102 and/or user account using an identifier (e.g., username, password, account identifier, network-connected device identification code, etc.) that is included within a communication (e.g., message, request, etc.) received from the network-connected device 102.

In some embodiments, the validation module 608 validates whether a user account and/or network-connected device 102 associated with the request has permission to receive operating program 128, files 130, or both. For example, in response to the external computing device 104 receiving a request for files 130 (e.g., configuration files), the validation module 608 authenticates the network-connected device 102 and/or a user account associated with the network-connected device 102, and the validation module may identify the files 130 that are to be sent to the network-connected device 102 and/or the dedicated memory area 124 in which those files 130 are stored.

In embodiments where the external computing device 104 is configured to provide a variety of operating programs 128 and/or personalized operating programs 128, the validation module 608 authenticates the user account associated with a network-connected device 102 and/or network-connected device 102, and then identifies the operating program 128 that is to be provided to the network-connected device 102. For example, after validating a user account associated with a network-connected device 102, the validation module 608 may determine what operating program 128 the network-connected device 102 is to receive by accessing a schedule that indicates one or more combinations of coded instructions stored in the program database that are to be distributed to corresponding network-connected devices 102.

The program distribution module 122 is executable on the one or more processors 602 to cause the external computing device 104 to distribute operating program 128 stored by in the program database 120 to corresponding network-connected devices 102. For example, the program distribution module 122 may select a combination of one or more coded instructions stored in the program database 120 that an individual network-connected device 102 is to receive, and/or may prepare the combination of one or more coded instructions for transmission to, and execution on, the network-connected device 102. FIG. 6 shows operating program 128 as being stored in program database 120. Alternatively, or in addition, the program database 120 may store a plurality of software modules that may be assembled to form a variety of operating programs 128 and/or a personalized operating program 128. In embodiments where the external computing device 104 is configured to provide a variety of operating programs 128 and/or personalized operating program 128, the program distribution module 122 may identify and/or assemble the operating program 128 that is to be provided to a network-connected device 102 based on an identification by the validation module 608.

The program distribution module 122 also may compress and/or encrypt the operating program 128 before transferring the operating program 128 to the network-connected device 102 over network 106. The operating program 128 transferred to the network-connected device 102 may include binary program code for operating program 128. Alternatively, or in addition, the operating program 128 may correspond to an executable image, such as a system image, that the network-connected device 102 may store and execute within the volatile memory storage 116.

The file distribution module 610 is executable on the one or more processors 602 to cause the external computing device 104 to distribute and/or synchronize files 130 stored in the dedicated memory area 124 to corresponding network-connected devices 102 for execution in a RAM-based file storage system. For example, in embodiments where the network-connected device 102 that store files 130, such as configuration files for operating program 128, in a RAM-based file storage system of the network-connected device 102, the network-connected device 102 and/or software operating on the network-connected device 102 (e.g., a program, module, operating system, bootloader, etc.) causes the network-connected device 102 to transmit a request to the external computing device 104 for the files 130. In some embodiments, the file distribution module 610 may distribute and/or synchronize files 130 in response to the validation module 608 authenticating the identity of network-connected device 102, a user account, or both. The file distribution module 610 also may cause the external computing device 104 to encrypt and/or compress the files 130 before they are transmitted to the network-connected device 102.

The dedicated memory area 124 is a non-volatile memory storage location within memory 604 that is reserved for data associated with the network-connected device 102, a user account, etc. For example, the dedicated memory area 124 may store files 130, such as statistics, programs, configurations, usage data, and/or other information associated with the network-connected device 102, and/or one or more users associated with the network-connected device 102. In some embodiments, the memory 604 includes a unique dedicated memory area 124 for each of a plurality of network-connected devices 102 to which the external computing device is configured to distribute files 130.

According to the present disclosure, the one or more processor(s) 202 and 602 depicted in FIGS. 2-3 and 6 may be configured to execute instructions, applications, or programs stored in memories 204 and 604. In some examples, the one or more processor(s) 202 and 602 include hardware processors that include, without limitation, a hardware central processing unit (CPU), a graphics processing unit (GPU), a field-programmable gate array (FPGA), a complex programmable logic device (CPLD), an application-specific integrated circuit (ASIC), a system-on-chip (SoC), or a combination thereof.

The memories 204 and 604 depicted in FIGS. 2-3 and 6 are examples of computer-readable media. Computer-readable media may include two types of computer-readable media, namely computer storage media and communication media. Computer storage media may include volatile and non-volatile, removable and non-removable media implemented in any method or technology for storage of information, such as computer-readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, such as network-connected device 102, external computing device 104, or other computing devices 114. In general, computer storage media may include computer-executable instructions that, when executed by one or more processors, cause various functions and/or operations described herein to be performed.

In contrast, communication media embody computer-readable instructions, data structures, program modules, or other data in a modulated data signal, such as a carrier wave, or other transmission mechanism. As defined herein, computer storage media does not include communication media.

Additionally, the network interfaces 206 and 606 include physical and/or logical interfaces for connecting the respective computing device(s) to another computing device or a network. For example, the network interfaces 206 and 606 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

FIG. 7 is a flowchart depicting methods 700, according to the present disclosure, for hosting a remote persistent file store service for network-connected devices that utilize a RAM-based file storage system.

As shown in FIG. 7, at operations 702 and 704, the external computing device receives and validates a request. The request is received at 702 from a network-connected device over a network, such as the internet. The request may correspond to a request for one or more operating programs that, when executed by the network-connected device, cause the network-connected device to perform one or more computing processes. For example, the network-connected device may not persistently store operating programs and/or configuration files necessary to perform the one or more computing processes, and thus must transmit a request for such operating programs and/or configuration files to the external computing device.

In an embodiment where the network-connected device stores computing files associated with the operating program in a RAM-based file storage system located on a volatile memory storage, the request may include a request for files, such as configuration files. The files may correspond to program files, configuration files, program statistics, computing files, usage data, or other information associated with the network-connected device 102, the operating program, and/or one or more users associated with the network-connected device 102. In some embodiments the request also may include authentication credentials such as a username, a password, a token, a digital certificate, and/or other identifiers that authenticate the network-connected device, an associated account, or a combination thereof.

Validating the request at 704 may correspond to the external computing device authenticating a requesting program or bootloader, and/or a user account. For example, the external computing device may validate the network-connected device and/or user account using an identifier (e.g., username, password, account identifier, network-connected device identification code, etc.) that is included within a communication (e.g., message, request, etc.) received from the network-connected device.

At operations 706 and 708, the external computing device accesses a dedicated memory area associated with the network-connected device, and accesses configuration files stored in the dedicated memory area. The dedicated memory area is a non-volatile memory storage that is accessible to the external computing device and is reserved for data associated with the network-connected device. For example, the dedicated memory area may store files, statistics, programs, configurations, usage data, or other information associated with the network-connected device, and/or one or more users associated with the network-connected device. In some embodiments, the external computing device hosts a unique dedicated memory area for each separate network-connected device to which the external computing device is configured to distribute operating programs and/or other files, such as computing files.

In some embodiments, the external computing device may host a plurality of dedicated memory areas, with each dedicated memory area corresponding to a different network-connected device. For example, as a service the external computing device may provide a persistent storage file backup for a plurality of network-connected devices and/or user accounts that utilize RAM-based file storage systems, with each network-connected device and/or user account having an individual dedicated memory area that contains a persistent file backup of files, statistics, programs, configurations, usage data, or other information associated with the network-connected device, and/or user account.

At operations 710 and 712, the external computing device encrypts and/or compresses the operating program and/or the configuration files, and transmits the operating program and/or the configuration files to the network-connected device. In some embodiments, the operating program and/or the configuration files may be transmitted over an encrypted connection between the external computing device and the network-connected device.

At operations 714 and 716, the external computing device may receive copies of files that have been edited in a RAM-based file storage system, and may verify the files. The files include copes of files in the RAM-based file storage system that have been appended, renamed, and/or deleted. In some embodiments, the external computing device also may receive a record keeping file that includes a list of file changes that have occurred since a last synchronization with the persistent file store in the dedicated memory area. Alternatively, or in addition, the list may include the names of files in the RAM-based file storage system that have been appended, renamed, and/or deleted. The list also may include information that indicates mirror files that included appended information and/or information describing the change, such as but not limited to, a type of change, a time of the change, a description of the change, a user account that made the change, a process associated with the change, etc. In some embodiments, verifying the files may include authenticating one or more of the network-connected device, a user account associated with the network-connected device, and/or the files using one or more identifiers received in the synchronization request.

At operation 718, the external computing device may store the files in the dedicated memory area associated with the network-connected device. At operation 720, the external computing device may transmit a notification to the network-connected device that the files have been synchronized successfully.

The methods 400 and 500 are described with reference to the environment 100 and systems 200 and 300 of FIGS. 1-3 for convenience and ease of understanding. Additionally, the method 700 is described with reference to the environment 100 and system 600 of FIGS. 1 and 6, respectively, for convenience and ease of understanding. However, the methods 400, 500, and 700 are not limited to being performed using the environment 100 and/or systems 200, 300 and 600. Moreover, the environment 100 and systems 200, 300 and 600 are not limited to performing the methods 400, 500, and 700.

The methods 400, 500, and 700 are illustrated as collections of blocks in logical flow graphs, which represent sequences of operations that may be implemented in hardware, software, or a combination thereof. In the context of software, the blocks represent computer-executable instructions stored on one or more computer-readable storage media that, when executed by one or more processors, perform the recited operations. Generally, computer executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the methods. In some embodiments, one or more blocks of the method may be omitted entirely. Moreover, the methods 400, 500, and 700 may be combined in whole or in part.

The various techniques described herein may be implemented in the context of computer-executable instructions or software, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

Examples of subject matter according to the present disclosure are described in the following enumerated paragraphs.

A0. A computer-implemented method for executing operating programs stored in a RAM-based file storage system stored in a RAM memory of a network-connected device, the method comprising:

booting the network-connected device;

executing, based on the booting of the network-connected device, a bootloader stored in a persistent memory of the network-connected device, wherein the bootloader, when executed, causes the network-connected device to:

connect, via a network connection, to an external computing device;

download, from the external computing device and via the network connection, an operating program to be executed by a processor of the network-connected device;

store the operating program in the RAM-based file storage system; and execute the operating program that is stored in the RAM-based file storage system.

A1. The computer-implemented method of paragraph A0, wherein booting the network-connected device corresponds to at least one of: (i) a boot of the network-connected device; and (ii) a reboot of the network-connected device.

A2. The computer-implemented method of any of paragraphs A0-A1, wherein the bootloader is stored in a root file system of the network-connected device, and the method further includes accessing the bootloader from the root file system.

A2.1. The computer-implemented method of any of paragraphs A0-A2, wherein the bootloader is a stub code in a boot process of the network-connected device, and wherein executing the bootloader comprises executing the stub code.

A2.2. The computer-implemented method of any of paragraphs A0-A2.1, wherein downloading the operating program comprises downloading, from the external computing device, an executable image for the operating program.

A2.3. The computer-implemented method of any of paragraphs A0-A2.2, wherein the RAM-based file storage system corresponds to a file storage system that is located in a simulated disk drive that resides in the RAM memory of the network-connected device.

A3. The computer-implemented method of any of paragraphs A0-A2.3, wherein the bootloader, when executed, causes the network-connected device to download the operating program through an encrypted channel associated with the network-connected device.

A4. The computer-implemented method of any of paragraphs A0-A3, further comprising authenticating, by the network-connected device, the network connection between the external computing device and the network-connected device.

A5. The computer-implemented method of any of paragraphs A0-A4, further comprising transmitting, via the network connection, authentication credentials to the external computing device, and wherein the operating program that is downloaded from the external computing device is downloaded based at least in part on the authentication credentials.

A5.1. The computer-implemented method of any of paragraphs A0-A5, further comprising transmitting, via the network connection and to the external computing device, a request for the operating program.

A5.2. The computer-implemented method of paragraph A5.1, wherein the request includes the authentication credentials.

A6. The computer-implemented method of any of paragraphs A0-A5.1, wherein the network-connected device is a router device.

A7. The computer-implemented method of any of paragraphs A0-A6, wherein the network-connected device is an internet-of-things device.

A8. The computer-implemented method of any of paragraphs A0-A7, wherein the external computing device is a cloud server.

A9. The computer-implemented method of any of paragraphs A5-A8, wherein the authentication credentials include one or more of a username, a password, a token, and a digital certificate.

A10. The computer-implemented method of any of paragraphs A0-A9, wherein connecting to the external computing device comprises establishing an encrypted channel between the external computing device and the network-connected device.

A11. The computer-implemented method of any of paragraphs A0-A10, wherein downloading the operating program comprises: downloading a compressed operating program; and decompressing the compressed operating program to generate the operating program.

A12. The computer-implemented method of any of paragraphs A0-A11, wherein downloading the operating program comprises downloading a binary program code for the operating program.

A13. The computer-implemented method of any of paragraphs A0-A12, further comprising validating, by the network-connected device, the integrity of the operating program.

A14. The computer-implemented method of paragraph A13, wherein validating the integrity of the operating program comprises: downloading, from the external computing device, at least one of a downloaded digital signature and a downloaded hash checksum; generating, by the downloaded operating program, at least one of a generated digital signature and a generated hash checksum; and verifying the integrity of the operating program by comparing the at least one of the downloaded digital signature or downloaded hash checksum to the at least one of the generated digital signature and the generated hash checksum.

A15. The computer-implemented method of any of paragraphs A0-A14, wherein executing the operating program that is stored in the RAM-based file storage system comprises accessing configuration files stored in the persistent memory.

A16. The computer-implemented method of any of paragraphs A0-A15, further comprising: downloading, from the external computing device and via the network connection, a new operating program to be executed by the processor, wherein the new operating program is different from the operating program; storing the new operating program in the RAM memory in the RAM-based file storage system; and executing the new operating program that is stored in the RAM-based file storage system.

A17. The computer-implemented method of paragraph A16, wherein the new operating program is an updated version of the operating program.

A18. The computer-implemented method of any of paragraphs A16-A17, wherein the network-connected device is configured to download the new operating program in response to at least one of a boot of the network-connected device and a reboot of the network-connected device that occurs after the operating program that is stored in the RAM-based file storage system is executed.

A19. The computer-implemented method of any of paragraphs A0-A18, wherein the operating program includes a parental control program configured to restrict network access for one or more user devices, user accounts, or a combination thereof, and wherein executing the operating program comprises restricting access of another computing device and/or user account to a content item.

B0. A computer-implemented method for storing configuration files in a RAM-based file storage system stored in a RAM memory of a network-connected device, the method comprising: connecting, by the network-connected device and via a network connection, to an external computing device; downloading, by the network-connected device and from the external computing device and via the network connection, configuration files to be executed by a processor of the network-connected device; storing, by the network-connected device, the configuration files in the RAM memory in the RAM-based file storage system; and executing, by the network-connected device, the configuration files that are stored in the RAM-based file storage system.

B1. The computer-implemented method of any of paragraphs A0-A19, further comprising executing configuration files that are stored in the RAM-based file storage system.

B2. The computer-implemented method of paragraph B1, wherein downloading the operating program further comprises downloading the configuration files from the external computing device and via the network connection, and the method further comprises storing, by the network-connected device, the configuration files in the RAM memory in the RAM-based file storage system.

B2.1. The computer-implemented method of any of paragraphs B0-B2, wherein the configuration files correspond to a parental control setting for a parental control program of the network-connected device, and the method further comprises restricting access of a network-connected device to a content item based on the parental control setting.

B2.2. The computer-implemented method of any of paragraphs B0-B2.1, wherein the configuration files include at least one of: a schedule of network permissions, a schedule of restrictions for one or more other computing devices, and a schedule of restrictions for one or more user accounts; and wherein the method further includes restricting access of a/the network-connected device to a/the content item based on the at least one of the schedule of network permissions, the schedule of restrictions for one or more user devices, and the schedule of restrictions for one or more user accounts.

B2.3. The computer-implemented method of any of paragraphs B0-B2.2, wherein the RAM-based file storage system corresponds to a file storage system that is located in a simulated disk drive that resides in the RAM memory of the network-connected device B3. The computer-implemented method of any of paragraphs B0-B2.3, further comprising transmitting, by the network-connected device, a request for the configuration files to the external computing device and via the network connection, wherein the request includes authentication credentials, and further wherein the downloading the configuration files includes downloading based at least in part on the authentication credentials.

B4. The computer-implemented method of paragraph B3, wherein the authentication credentials correspond to one or more of a username, a password, a token, and a digital certificate.

B5. The computer-implemented method of any of paragraphs B0-B4, wherein the configuration files are persistently stored by the external computing device in a memory area dedicated to the network-connected device.

B6. The computer-implemented method of any of paragraphs B0-B5, further comprising validating, by the network-connected device, the integrity of the configuration files.

B7. The computer-implemented method of paragraph B6, wherein validating the integrity of the configuration files is based at least in part on one or more of a digital signature and a hash checksum of the configuration files.

C0. A computer-implemented method for capturing changes to files stored in a RAM-based file storage system that is stored in a RAM memory of a network-connected device, the method comprising: creating, by the network-connected device, the RAM-based file storage system; placing, by the network-connected device, a lock on a computing file stored within the RAM-based file storage system; making, by the network-connected device, a change to the computing file stored within the RAM-based file storage system; making, by the network-connected device, a record edit to a record keeping file stored within the RAM-based file storage system, wherein the record edit includes information that describes the change; and releasing, by the network-connected device, the lock on the computing file.

C1. The computer-implemented method of any of paragraphs A0-B7, further comprising creating, by the network-connected device, the RAM-based file storage system.

C2. The computer-implemented method of any of paragraphs A0-B7, further comprising capturing, by the network-connected device, changes to computing files stored in the RAM-based file storage system by: placing a lock on a computing file stored within the RAM-based file storage system; making a change to the computing file stored within the RAM-based file storage system; making a change to a record keeping file stored within the RAM-based file storage system, wherein the record edit includes information associated with the change; and releasing the lock on the computing file.

C2.1. The computer-implemented method of any of paragraphs A0-C2, further comprising: determining a size of a selected file, which is to be at least one of created and edited; storing the selected file in the RAM-based file storage system if the size of the selected file is greater than a threshold; and storing the selected file in a/the persistent memory storage if the size of the selected file is less than the threshold.

C3. The computer-implemented method of any of paragraphs C0 and C2, wherein the making the record edit to the record keeping file includes making a list of at least one of changes and files that have been changed since a last synchronization with a persistent file store.

C4. The computer-implemented method of any of paragraphs C0 and C2-C3, wherein placing the lock comprises receiving, from a program executing on the RAM memory, a request to open the computing file stored within the RAM-based file storage system, and wherein placing the lock is based at least in part on the request.

C5. The computer-implemented method of any of paragraphs C0 and C2-C4, wherein making the change includes: appending new data to the computing file stored within the RAM-based file storage system; creating a mirror append file that includes the new data; and inserting the mirror append file into a list of files that contains information that has not yet been updated to a/the persistent file store.

C6. The computer-implemented method of any of paragraphs C0 and C2-C5, wherein making the change includes deleting the computing file stored within the RAM-based file storage system, and wherein making the record edit to the record keeping file stored within the RAM-based file storage system further comprises adding information that the computing file stored within the RAM-based file storage system is deleted.

C7. The computer-implemented method of any of paragraphs C0 and C2-C6, wherein making the file edit includes renaming the computing file stored within the RAM-based file storage system, and wherein making the record edit to the record keeping file stored within the RAM-based file storage system further comprises adding information that the computing file stored within the RAM-based file storage system is renamed.

D0. A computer-implemented method for synchronizing one or more files stored in a RAM-based file storage system with a remote persistent file store, which is external from a network-connected device, the method comprising: verifying a network connection; connecting, via the network connection, to an external computing device; placing a lock on the one or more files stored in the RAM-based file storage system; accessing a record keeping file that includes a list of changes that have occurred since a last synchronization with the remote persistent file store; generating a data package including the files in the list of changes; releasing the lock of the one or more files; and uploading the data package to the external computing device for synchronizing with the remote persistent file store.

D1. The computer-implemented method of any of paragraphs A0-C7, further comprising synchronizing, by the network-connected device, one or more files stored in the RAM-based file storage system with a/the remote persistent file store external from the network-connected device.

D2. The computer-implemented method of paragraph D1 wherein the synchronizing comprises: verifying a/the network connection; connecting, via the network connection, to the external computing device; placing a lock on the one or more files stored in the RAM-based file storage system; accessing an/the record keeping file that includes a/the list of changes that have occurred since a last synchronization with the remote persistent file store external from the network-connected device; generating a data package including the files in the list of changes; releasing the lock of the one or more files; and uploading the data package to the external computing device for synchronizing with the remote persistent file store.

D3. The computer-implemented method of any of paragraphs D0 and D2, further comprising checking, by the network-connected device, for new changes to be synchronized with the remote persistent file store.

D3.1. The computer-implemented method of paragraph D3, wherein checking for new changes comprises repeatedly checking, by the network-connected device, for changes to be synchronized with the remote persistent file store.

D4. The computer-implemented method of paragraph D3, wherein checking for new changes comprises accessing the record keeping file to determine if changes have occurred since the last synchronization with the remote persistent file store external from the network-connected device, and further wherein the method includes repeating the uploading at least partially responsive to determining that changes have occurred since the last synchronization.

D5. The computer-implemented method of any of paragraphs D0-D4, wherein the remote persistent file store corresponds to a location in a dedicated memory area external to the network-connected device that is dedicated to the network-connected device.

D6. The computer-implemented method of any of paragraphs D0-D5, wherein generating the data package including the files in the list of changes comprises packaging the files in the list of changes into a compressed format.

D7. The computer-implemented method of any of paragraphs D0-D6, wherein generating the data package including the files in the list of changes comprises packaging the files in the list of changes into a bundled format.

D8. The computer-implemented method of any of paragraphs D0-D7, wherein uploading the data package to the external computing device for synchronizing with the remote persistent file store comprises uploading authentication credentials in association with the data package.

D9. The computer-implemented method of paragraph D8, wherein the authentication credentials correspond to one or more of a username, a password, a token, and a digital certificate.

D10. The computer-implemented method of any of paragraphs D0-D9, further comprising: creating a mirror record keeping file in the RAM-based file storage system that includes the list of changes that have occurred since the last synchronization with the remote persistent file store external from the network-connected device; and deleting the record keeping file.

D11. The computer-implemented method of paragraph D10, further comprising: receiving, from the external computing device, a notification that synchronization has occurred; and deleting the mirror record keeping file from the RAM-based file storage system responsive to the notification.

E0. A computer-implemented method for synchronizing files stored in a persistent memory of an external computing device with RAM-based file storage systems of a plurality of network-connected devices, the method comprising: storing, in the persistent memory of the external computing device, an operating program for a given network-connected device of the plurality of network-connected devices; accepting a new network connection from the given network-connected device of the plurality of network-connected devices; authenticating the given network-connected device; receiving, from the given network-connected device and via the network connection, a request for the operating program; and transmitting, to the given network-connected device and via the network connection, the operating program.

E1. The computer-implemented method of paragraph E0, further comprising: storing, in the persistent memory, configuration files for the given network-connected device; receiving, from the given network-connected device and via the network connection, an additional request for the configuration files for the given network-connected device; and transmitting, to the given network-connected device and via the network connection, the configuration files for the given network-connected device, wherein the transmitting the operating program is at least partially responsive to the receiving the additional request.

E2. The computer-implemented method of paragraph E1, wherein the additional request is included in the request for the operating program.

E3. The computer-implemented method of any of paragraphs E1-E2, further comprising encrypting one or more of the operating program and the configuration files before transmission to the given network-connected device.

E4. The computer-implemented method of any of paragraphs E1-E3, further comprising: receiving a data package comprising changes that have occurred since a last synchronization with the configuration files for the given network-connected device stored in the persistent memory; and synchronizing, based on the package, the configuration files for the given network-connected device stored in the persistent memory.

E5. The computer-implemented method of paragraph E4, further comprising transmitting, to the given network-connected device and via the network connection, a notification that the configuration files for the given network-connected device stored in the persistent memory have been synchronized.

E6. The computer-implemented method of any of paragraphs E0-E5, wherein the request, a/the additional request, and/or a/the data package include authentication credentials, and further wherein the operating program and/or configuration files are transmitted based at least in part on the authentication credentials.

E7. The computer-implemented method of paragraph E6, wherein the authentication credentials correspond to one or more of a username, a password, a token, and a digital certificate.

F0. A network-connected device, comprising: a processor; a RAM memory; and a persistent memory storage that stores non-transitory computer-readable instructions that, when executed by the processor, cause the network-connected device to perform the method of any of paragraphs A0-D11.

G0. A non-transitory computer-readable medium storing instructions that, when executed by a processor cause a computing device to perform the computer-implemented method of any of paragraphs A0-D11.

G1. An external computing device, comprising: a processor; a RAM memory; and a persistent memory storage that stores non-transitory computer-readable instructions that, when executed by the processor, cause the external computing device to perform the method of any of paragraphs E0-E7.

G2. A non-transitory computer-readable medium storing instructions that, when executed by a processor cause a computing device to perform the computer-implemented method of any of paragraphs E0-E7.

H0. The use of the network-connected device of paragraph F0 to perform the computer-implemented method of any of paragraphs A0-D11.

T0. The use of the non-transitory computer-readable medium of paragraph G0 to perform the computer-implemented method of any of paragraphs A0-D11.

J0. The use of the external computing device of paragraph G1 to perform the method of any of paragraphs E0-E7.

K0. The use of the non-transitory computer-readable medium of paragraph G2 to perform the method of any of paragraphs E0-E7.

INDUSTRIAL APPLICABILITY

The systems and methods disclosed herein are applicable to network-connected devices. The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A network router device, comprising:
   a processor;
   a RAM memory that includes a RAM-based file storage system that is located in a simulated disk drive that resides in the RAM memory;
   a persistent memory storage that stores a bootloader that is configured to, in response to a booting of the network router device, cause the network router device to:
      connect, via a network connection, to an external computing device;
      download, from the external computing device and via the network connection, an operating program to be executed by a processor of the network router device;
      store the operating program in the RAM-based file storage system; and
      execute the operating program that is stored in the RAM-based file storage system; and wherein
   the persistent memory storage further comprises computer-readable instructions for:
      making a change to a computing file stored in the persistent memory storage of the network router device;
      recording the change in a record keeping file of the network router device;
      transmitting the record keeping file to the external computing device via the network connection; and
      deleting the record keeping file from the persistent memory storage of the network router device.

2. The network router device of claim 1, wherein the bootloader is a stub code in a boot process of the network router device, and wherein the stub code is executed during execution of the boot process of the network router device.

3. The network router device of claim 1, wherein downloading the operating program comprises downloading, from the external computing device, an executable image for the operating program.

4. The network router device of claim 1, wherein the operating program includes a parental control program configured to restrict network access of one or more of a user device and a user account, and wherein executing the operating program comprises causing the network routing device to restrict access of at least one of the user device and the user account to a content item.

5. The network router device of claim 1, wherein the network router device is configured to execute the bootloader a second time in response to a second booting of the network router device that occurs after the operating program that is stored in the RAM-based file storage system is executed, and wherein the bootloader is configured to, in response to the second booting, cause the network router device to download a new operating program from the external computing device.

6. The network router device of claim 1, wherein the persistent memory storage further comprises computer-readable instructions for transmitting the computing file to the external computing device after the change has been made to the computing file.

7. The network router device of claim 1, wherein the persistent memory storage further comprises computer-readable instructions for:
   when making the change to the computing file:
      placing a lock on the computing file;
      making the change; and
      releasing the lock on the computing file; and
   when recording the change in the record keeping file:
      making a record edit to the record keeping file, wherein the record edit comprises information associated with the change.

8. A computer-implemented method for storing configuration files in a RAM-based file storage system stored in a RAM memory of a network-connected device, the method comprising:
   connecting, by the network-connected device and via a network connection, to an external computing device;
   downloading, by the network-connected device and from the external computing device and via the network connection, configuration files to be executed by a processor of the network-connected device;
   storing, by the network-connected device, the configuration files in the RAM memory in the RAM-based file storage system;
   executing, by the network-connected device, the configuration files that are stored in the RAM-based file storage system; and
   capturing, by the network-connected device, changes to computing files stored in the RAM-based file storage system by:
      placing a lock on a computing file stored within the RAM-based file storage system;
      making a change to the computing file stored within the RAM-based file storage system;

making a record edit to a record keeping file stored within the RAM-based file storage system, wherein the record edit includes information associated with the change; and releasing the lock on the computing file.

9. The computer-implemented method of claim 8, further comprising:

transmitting, by the network-connected device, a request for the configuration files to the external computing device and via the network connection, wherein the request includes authentication credentials, and wherein the downloading the configuration files includes downloading based at least in part on the authentication credentials.

10. The computer-implemented method of claim 8, further comprising creating, by the network-connected device, the RAM-based file storage system.

11. The computer-implemented method of claim 8, further comprising synchronizing, by the network-connected device, one or more files stored in the RAM-based file storage system with a remote persistent file store external from the network-connected device.

12. The computer-implemented method of claim 8, wherein the computing file comprises one or more of program files, program statistics, the configuration files, usage data, and other information associated with the network-connected device.

13. The computer-implemented method of claim 8, further comprising transmitting the record keeping file, including the record edit, to the external computing device and deleting the record keeping file.

14. The computer-implemented method of claim 13, further comprising deleting the record keeping file after transmitting the record keeping file to the external computing device.

15. The computer-implemented method of claim 8, wherein the information associated with the change comprises one or more of a file edit, a name of a file stored in the RAM-based file storage system that was changed, a type of the change, a time of the change, a description of the change, a user account that made the change, and a process associated with the change.

\* \* \* \* \*